United States Patent [19]

Carbrey

[11] 3,828,145

[45] Aug. 6, 1974

[54] COMMUNICATION SYSTEM HYBRID BALANCE ARRANGEMENT

[75] Inventor: Robert Lawrence Carbrey, Boulder, Colo.

[73] Assignee: Bell Telephone Laboratories, Incorporated, Murray Hill, N.J.

[22] Filed: Mar. 21, 1973

[21] Appl. No.: 343,272

[52] U.S. Cl. .......................... 179/170 NC, 179/15 AT

[51] Int. Cl. .............................................. H04m 1/58

[58] Field of Search ...... 179/170 NC, 18 BC, 1 CN, 179/15 AT, 15 BF, 175.2 R, 175.2 C, 15 AD, 170.4, 170.8; 178/59; 325/42

[56] References Cited

UNITED STATES PATENTS

| | | | |
|---|---|---|---|
| 2,144,710 | 1/1939 | Romnes | 179/170.4 |
| 2,303,419 | 12/1942 | Affel | 179/170.8 |
| 3,251,946 | 5/1966 | Pfleiderer | 179/15 AD |
| 3,566,031 | 2/1971 | Carbone | 178/59 |
| 3,745,256 | 7/1973 | Carbrey | 179/170 NC |
| R27,047 | 2/1971 | Lucky | 325/42 |

*Primary Examiner*—David L. Stewart
*Attorney, Agent, or Firm*—J. S. Cubert

[57] ABSTRACT

A time division communication system wherein a plurality of time slots occurs in repetitive frames includes a plurality of lines, an incoming time division bus and an outgoing time division bus. Each line has an associated hybrid circuit that comprises balancing apparatus for minimizing the portion of the incoming bus signal returned to the outgoing bus through the hybrid circuit. Adjustment of the balance for a selected hybrid is done during the plurality of time frames in a predetermined time interval. The polarities of the incoming signal to the hybrid and the outgoing signal from the hybrid are detected in each frame. A first type signal is generated when the detected polarities are the same and a second type signal is generated when the detected polarities are different. Responsive to the sequence of first and second type signals, a control signal is produced which is applied to the balancing apparatus of the selected hybrid circuit.

21 Claims, 5 Drawing Figures

COMMUNICATION SYSTEM HYBRID BALANCE ARRANGEMENT

BACKGROUND OF THE INVENTION

My invention relates to transmission arrangements in communication systems and more particularly to signal transmission in time division multiplex communication systems utilizing electronic hybrid circuits.

In many types of communication systems, it is necessary to couple a bidirectional communication path to the incoming and outgoing paths of a four-wire transmission arrangement. This is generally done in a hybrid circuit which is adapted to couple a signal from the incoming path to the bidirectional path and to couple only the outgoing signal from the bidirectional path to the four-wire line outgoing path. In one type of time division communication system such as disclosed in my copending application Ser. No. 276,833, filed July 31, 1972, each of a plurality of lines has an associated hybrid circuit adapted to couple a signal from an incoming time division bus to said line in a distinct time slot of a repetitive time slot frame and to couple the outgoing signal from the line to an outgoing time division bus in the same distinct time slot. Signals are exchanged among a plurality of selected lines in a particular time slot by connecting each selected line hybrid to said incoming and outgoing time division buses in the particular time slot. A summing circuit is connected between the outgoing and incoming time division buses so that the selected line outgoing signals appearing on the outgoing time division bus in the particular time slot are summed and the sum signal is applied to each selected hybrid circuit via the incoming time division bus.

The hybrid circuit is also adapted to prevent the incoming signal thereto from being coupled to the outgoing time division bus and to subtract the outgoing line signal from the sum signal appearing on the incoming time division bus in the particular time slot whereby each selected line receives only the signals from the other selected lines. When a portion of the sum signal is returned to the outgoing time division bus regenerative interference effects are likely to occur because the selected line signal is returned to originating line. A hybrid circuit may be adjusted to provide the needed signal directionality but such an adjustment is a function of the impedance match between the line and the hybrid circuit. Consequently, changes in conditions on the bidirectional line require that adjustments be made on a periodic or continuous basis. This is particularly true where two stations are temporarily bridged onto a single line whereby the impedance match is drastically altered or even where the handset position is changed during a call whereby a relatively minor change in impedance occurs. These two conditions which may occur during any call connection result in troublesome changes in line impedance. It is, therefore, advantageous to provide automatic hybrid balance adjustment and further advantageous to provide for the balance adjustment of a plurality of hybrid circuits utilizing equipment common to all the hybrid circuits in a time division communication system.

BRIEF SUMMARY OF THE INVENTION

The invention is a communication system that includes a plurality of lines, an incoming bus and an outgoing bus. Each line has an associated hybrid circuit adapted to couple the outgoing signal from the line to the outgoing bus and to couple the incoming signal from the incoming bus to the line. Each hybrid circuit further comprises balancing apparatus for minimizing the portion of the incoming bus signal returned through the hybrid circuit to the outgoing bus. The polarity of the signal appearing at the hybrid from the incoming bus is detected and the polarity of the signal on the outgoing bus from the hybrid is also detected. A first type signal is produced when the detected signal polarities are the same and a second type signal is produced when the detected signal polarities are the same. Responsive to the first and second type signals, a control signal is generated which is applied to the hybrid circuit balancing apparatus.

According to one aspect of the invention, a time division communication system wherein a plurality of time slots occurs in repetitive cycles includes a plurality of lines, an incoming time division bus and an outgoing time division bus. Each line has an associated hybrid circuit adapted to couple the outgoing signal from the line to the outgoing time division bus in a distinct time slot and to couple an incoming signal from said incoming time division bus to said line in said distinct time slot. Each hybrid circuit further comprises balancing apparatus for minimizing the portion of the incoming bus signal returned through the hybrid circuit to the outgoing bus. A distinct hybrid circuit is selected for balancing adjustment in a plurality of repetitive time slot cycles during a predetermined time interval. In each repetitive cycle, the polarity of the signal appearing at the hybrid from the incoming time division bus is detected and the polarity of the signal on the outgoing time division bus from said hybrid is also detected. A first type signal is produced when the detected signal polarities are the same and a second type signal is produced when the detected signal polarities are opposite. Responsive to the sequence of the first and second type signals occuring during said predetermined time interval, a control signal is generated which is applied to said selected hybrid circuit balancing apparatus.

According to one aspect of the invention, a hybrid circuit is balanced when it is not actively engaged in a call connection. The selected hybrid circuit and a tone source are addressed in a distinct time slot of each repetitive cycle during a test time interval. A sample of the tone is applied to the selected hybrid via the incoming bus and the outgoing signal from the selected hybrid appears on the outgoing bus in each distinct time slot. The polarity of the tone sample is detected as well as the polarity of the outgoing hybrid signal sample. A first type signal is generated in each distinct time slot when the polarity of the tone sample matches the polarity of the outgoing hybrid signal sample. A second type signal is generated in each distinct time slot when the polarity of the tone sample and the polarity of the outgoing hybrid signal sample are not matched. In response to the sequence of first and second type signals occurring during the test time interval, a control signal is produced corresponding to the degree of imbalance in the selected hybrid circuit and said control signal is applied to the balancing apparatus of the selected hybrid circuit.

According to another aspect of the invention, a hybrid circuit is balanced while participating as the listening party in a call connection. The hybrid circuits are divided into first and second groups, each group having an incoming and an outgoing time division bus. The status of the selected hybrid circuit is tested to determine that it is the listening party in the call connection and that the call connection involves one hybrid circuit from one group and another hybrid circuit from the other group. In this event, the sum of the outgoing signals occurring during time slot of the call connection is applied to a store wherein the polarity of the sum signal is placed; and the polarity of the selected hybrid outgoing signal resulting from the sum signal is detected. The two signal polarities are compared. A first type signal is generated if the signal polarities match and a second type signal is generated when the signal polarities do not match. Responsive to the sequence of first and second type signals occurring during the testing time interval, a control signal is produced and said control signal is applied to the selected hybrid circuit balancing apparatus to connect the imbalance of the selected hybrid circuit.

According to another aspect of the invention, the degree of balance of a hybrid circuit is tested while a hybrid is participating in a call connection through the use of an auxiliary idle time slot in each repetitive frame. During the time slot assigned to the call connection, the polarity of the sum signal from the participating hybrid circuits is detected. During a subsequent auxiliary time slot in the same repetitive frame, the polarity of the selected hybrid circuit outgoing signal is detected. A first type signal is generated when there is a difference in polarity between the sum signal and the selected hybrid circuit outgoing signal; and a second type signal is generated when there is no difference between the polarity of the sum signal and the polarity of the selected hybrid circuit outgoing signal. Responsive to the sequence of first and second type signals obtained in the testing time interval, a control signal is generated and applied to the balancing apparatus in the selected hybrid circuit.

According to another aspect of the invention, the sequence of first and second type signals obtained during hybrid balance testing is applied to bidirectional counting apparatus which is reset to its mid position on overflow or underflow. An imbalance of the selected hybrid circuit causes the count to exceed the capacity of the counting apparatus and a code corresponding to the number of overflows or underflows is stored in a register. The register code is converted into an analog control signal and said control signal is transmitted to the selected hybrid circuit balancing apparatus.

According to yet another aspect of the invention, the code in the register at the end of the test interval is stored in a selected position of a memory array reserved for indications of the balance state of the tested hybrid circuit. Said stored code is periodically addressed and a control signal corresponding to the stored code returned to the hybrid circuit to maintain the balance of the originally tested hybrid circuit.

DETAILED DESCRIPTION

Figure 1:
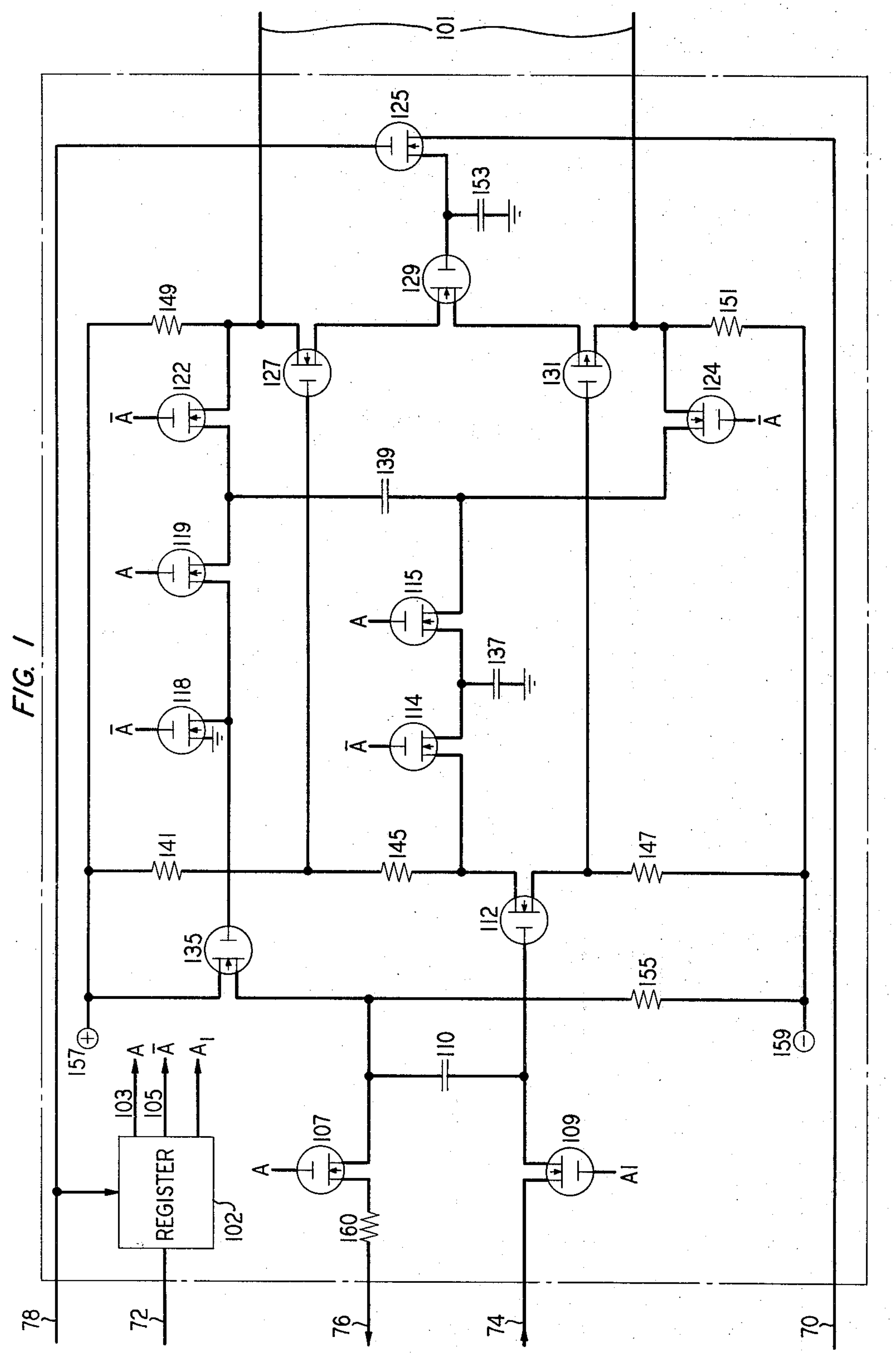
FIG. 1 depicts a schematic diagram of the hybrid circuit including balancing apparatus that may be used in the embodiment of the invention.
Figure 2:
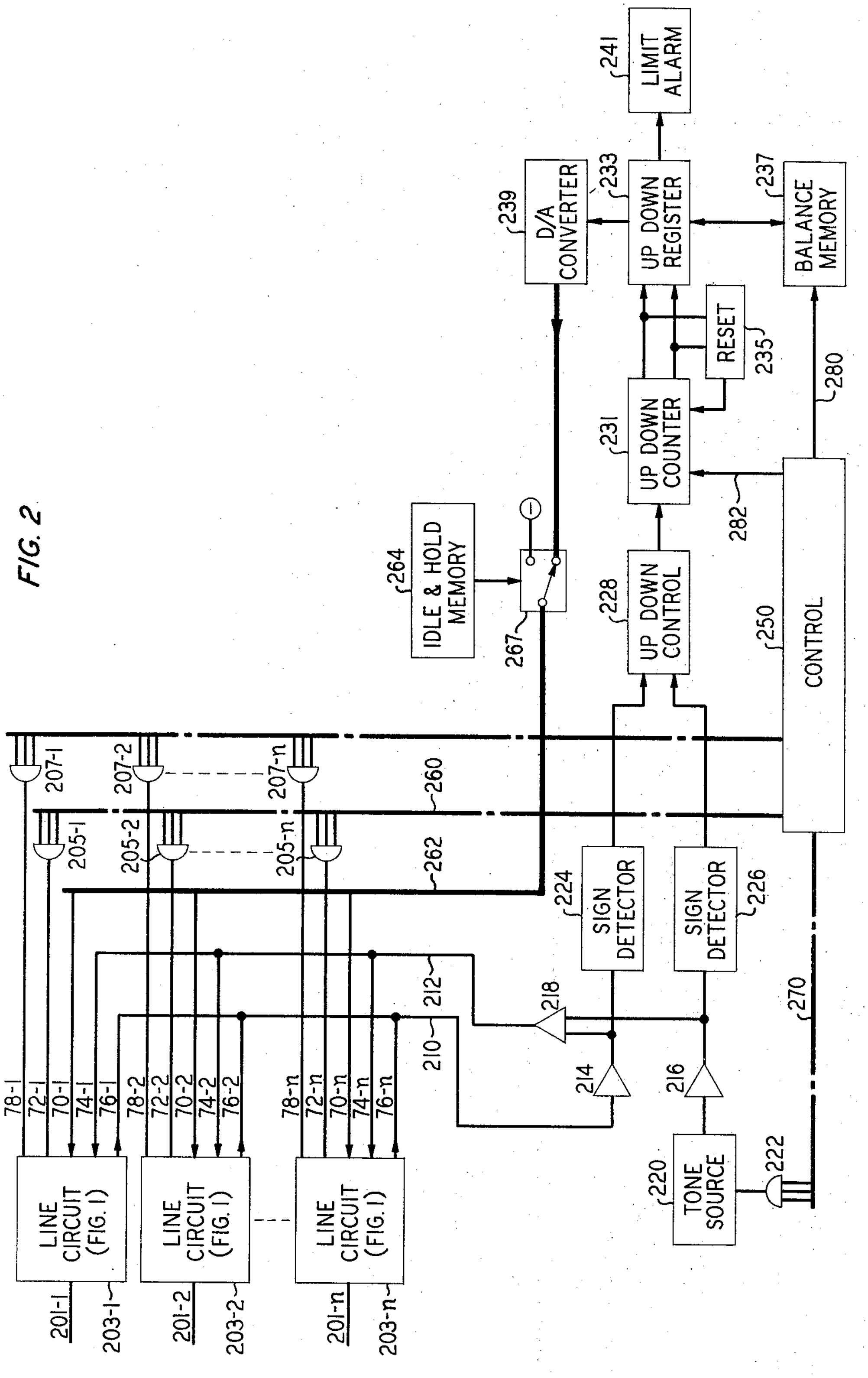
FIG. 2 depicts a block diagram of the one embodiment of the invention wherein a hybrid line circuit is balanced when not actively engaged in a call connection.
Figure 3:
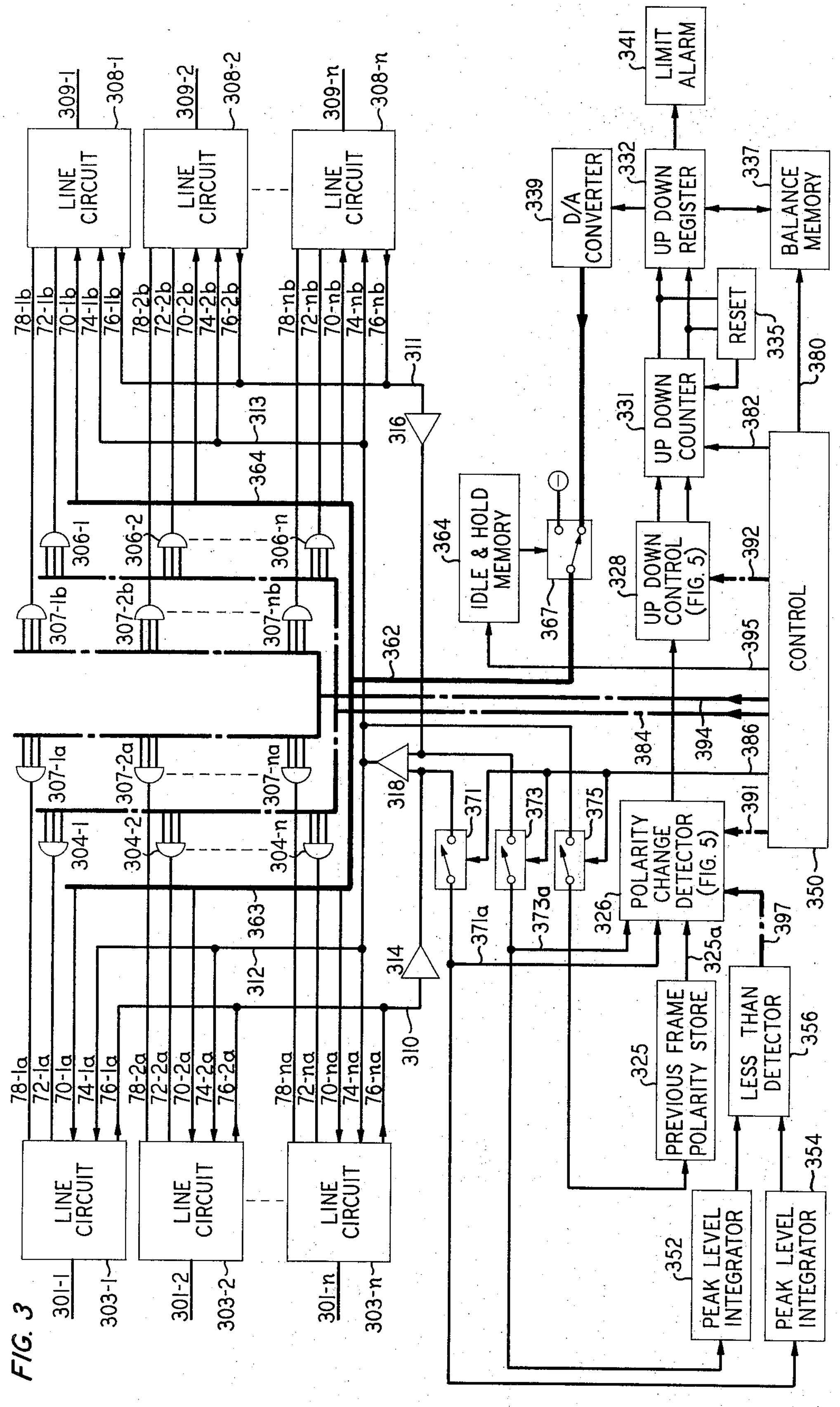
FIG. 3 depicts a block diagram of another embodiment of the invention wherein a hybrid line circuit is balanced while participating as a listening party in a call connection.
Figure 4:
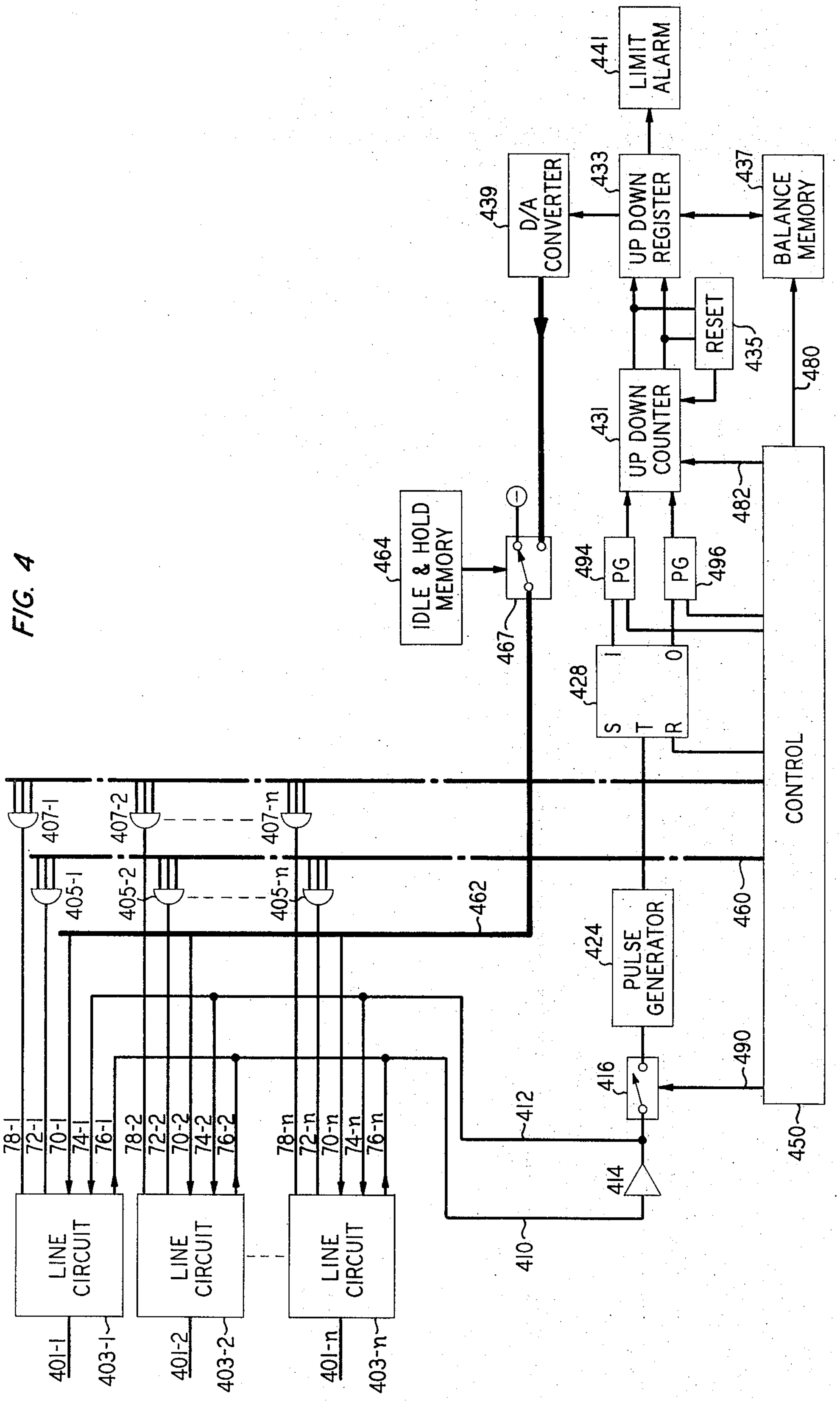
FIG. 4 depicts a block diagram of yet another embodiment of the invention wherein a hybrid line circuit is balanced while participating in a call connection by use in an auxiliary idle time slot in each test interval frame.

FIG. 1 shows a line circuit that may be used in the invention. This circuit is shown by way of example only and it is to be understood that other types of line circuit may be used as well. In FIG. 1, the line circuit is connected to two-wire line 101 and is also connected to an incoming time division bus via lead 74 and to an outgoing time division bus via lead 76. Register 102 receives a coded signal from lead 72 which causes the register to store a code corresponding to the time slot in which the line circuit is participating in a call connection. The control signal to balance the hybrid line circuit is applied to the circuit via lead 70. A plurality of line circuits are selectively connected to the incoming and outgoing time division buses in a distinct time slot and a summing network is arranged between the buses as shown in FIGS. 2, 3 and 4 so that the line outgoing signals in a distinct time slot are summed and the sum is returned to each line circuit via the incoming time division bus.

The line circuit of FIG. 1 comprises storage capacitors 110, 137 and 139, a phase-splitting amplifier including insulated gate field effect transistor (IGFET) 112, a line driver amplifier including IGFETs 127 and 131, balance apparatus including IGFET switch 125, storage capacitor 153 and IGFET 129, and IGFET switches 107, 109, 114, 115, 118, 119, 122 and 124. The IGFET switches are all of the n-enhancement type well known in the art; but it is to be understood that other types of semiconductor devices may be used. IGFET 107 selectively connects one terminal of storage capacitor 110 and the source electrode of source follower 135 to outgoing lead 76 via impedance 160. During the distinct time slot, control signal A is made positive and this positive signal is applied to the gate electrode of IGFET 107. In response to the positive signal applied to the gate, a conductive path is established between the source and drain electrodes of IGFET 107. Control signal A is made more positive than the largest expected positive signal applied to either the source or drain electrodes of IGFET 107 so that IGFET 107 is maintained in a conductive state responsive to a positive control signal A. In this way, a bidirectional path is provided between the source and drain of IGFET 107 as long as control signal A is sufficiently positive. When control signal A is negative going, the source drain path of IGFET 107 is rendered nonconductive. The negative excursion of control signal A must be greater than the largest expected negative signal appearing at either the source or expected negative signal appearing at either the source or drain of IGFET 107 so that IGFET 107 is properly maintained in its nonconductive state. Control signal A is applied to each of IGFET switches 107, 115 and 119 so that these switches are conductive only during the distinct time slot. Control signal A1 becomes positive and is applied to IGFET switch 109 during distinct time slots in response to the signal on lead 72. It is sometimes desired to obtain a sample of the outgoing signal without inserting a signal from the incoming bus via lead 74. In this event, signal A becomes positive, but signal A1 remains negative going in response to a signal applied to register 102 via lead 78.

IGFET switches 114, 118, 122 and 124 receive control signal $\bar{A}$ at their gate electrodes. This control signal is positive going at all times except during the distinct time slot, and during the outgoing signal sampling time slot when control signal $A_1$ remains negative. Thus, the switches are in their nonconductive states only during the distinct and outgoing signal sampling time slots. The negative excursion of control signal $\bar{A}$ is selected to be greater than the largest expected negative signal applied to either the source or drain electrodes of the associated switch so that the switch is maintained in its nonconductive state during the distinct and outgoing signal sampling time slots. At all other times, the positive excursion of control signal $\bar{A}$ must be greater than the largest expected positive signal on either the source or drain electrodes of the associated switch whereby a conductive path is maintained.

Assume for purposes of illustration that storage capacitor 110 contains a signal e1 prior to the distinct time slot. Since control signal $\bar{A}$ is positive at this time, the source drain paths of IGFET switches 114, 122, 124 and 118 are conductive and the gate electrode of IGFET amplifier 112 receives the stored signal e1 from one terminal of capacitor 110. The other terminal of capacitor 110 is connected to the source electrode of source follower 135. Since IGFET switch 118 is conducting responsive to control signal $\bar{A}$, the source electrode of source follower 135 is at or very close to ground potential and the terminal of capacitor 110 connected thereto is referenced to ground potential. This reference voltage provides an appropriate bias point for the operation of the gate of IGFET 112.

The drain electrode of IGFET 112 is connected to positive voltage source 157 via series connected impedances 141 and 145; and the source electrode of IGFET 112 is connected to negative voltage source 159 through impedance 147. This arrangement provides a d.c. biasing path for IGFET 112 whereby this IGFET operates in its linear range. Impedances 141, 145 and 147 are equal valued. As is well known in the art, IGFET 112 is operative responsive to signal e1 applied to its gate electrode to provide a signal −2e1 on its drain electrode and a signal e1 on its source electrode. In the interval between distinct time slots, the drain electrode of IGFET 112 is connected to storage capacitor 137 via conducting IGFET switch 114. In this way, the signal −2e1 is stored in capacitor 137 by the beginning of the next distinct time slot.

N-type IGFET 127 and p-type IGFET 131 are operative to couple the output signals from IGFET amplifier 112 to line 101. The drain electrode of IGFET 127 is connected to positive voltage source 157 through impedance 149. The drain electrode of IGFET 129 is connected to the source electrode of IGFET 127 and the source electrode of IGFET 129 is connected to the source electrode of IGFET 131. The drain of IGFET 131 is connected to negative voltage source 159 via impedance 151. In this way, a complete d.c. path is provided from positive voltage source 157 through IGFETs 127, 129 and 131 to negative voltage source 159 whereby IGFETs 127 and 131 are operative in their linear range.

A signal −e1 is applied to the gate electrode of IGFET 127 from the junction between impedances 141 and 145 while a signal e1 is applied to the gate electrode of IGFET 131. Responsive to the signal −e1 on the gate of IGFET 127, the signal e1 appears at the drain electrode of IGFET 127, and responsive to the signal e1 on the gate of IGFET 131, the signal e1 appears at the drain electrode of IGFET 131. In this way, a balanced signal is applied to line 101. Since IGFET switches 122 and 124 are closed responsive to control signal $\bar{A}$ in the time interval between successive distinct time slots, a signal 2e1+e2 is stored in capacitor 139 where e2 represents the outgoing line signal appearing across line 101.

During the next occurring distinct time slot, control signals A and A1 become positive going and control signal $\bar{A}$ becomes negative going so that switches 107, 109, 115 and 119 are closed and switches 114, 118, 122 and 124 are opened. Storage capacitors 137 and 139 are then serially connected with each other to the gate electrode of source follower 135 via closed IGFET switches 115 and 119. Since the signal voltage stored on capacitor 137 is −2e1 and the signal stored in capacitor 139 is +2e1+e2, the resulting signal applied to the gate of source follower 135 is e2. Thus only the line outgoing signal is applied to source follower 135 and therefrom to one terminal of capacitor 110 and to the outgoing time division bus via switch 107, impedance 160 and lead 76. The sum signal from the incoming time division bus is applied to the other terminal of capacitor 110 via IGFET switch 109 so that capacitor 110 stores the sum of all outgoing line signals less the outgoing signal from line 101 which is equivalent to the outgoing signals from all other selected lines. The signal stored in capacitor 110 is applied to the gate electrode of IGFET amplifier 112. In this way, only the signals from all other selected lines are applied to line 101 and only the outgoing signal from line 101 is applied to the outgoing time division bus in the distinct time slot.

The cancellation of the incoming signal in serially connected capacitors 137 and 139 occurs only if the signal from line driver amplifier including IGFETs 127 and 131, and line 101 is balanced with respect to the output of amplifier 112. Otherwise, a residual component of the incoming signal appears on the gate of source follower 135 during the distinct time slot. Thus, if there is no outgoing line signal from line 101 and line 101 is appropriately balanced, no portion of the incoming signal appears on lead 76 during the distinct time slot. If, however, the impedance of line 101 varies, a portion of the incoming signal will appear on lead 76 and this incoming signal is returned to line 101 via the incoming time division bus.

IGFET 129 is used to control the gain of the line driving amplifier including IGFETs 127 and 131 so that balance can be maintained. This is accomplished by a balance signal being applied from lead 70 through switch 125 during a time slot of each frame that is used for balancing. IGFET switch 125 is closed responsive to a signal on cable 78. The balance signal is stored in capacitor 153. The signal stored in capacitor 153 is applied to the gate of IGFET 129 so that the resistance of the drain source path of IGFET 129 is modified in accordance with the control signal on capacitor 153. A change of the resistance of the source-drain path of IGFET 129 changes the output signals from IGFETs 127 and 131 and this change is arranged to restore balance in the line circuit.

In FIG. 1 IGFET 129 is connected between the source electrodes of IGFETs 127 and 131. In response to the signal stored on capacitor 153, the resistance of the source-drain path of IGFET 129 is varied so as to restore balance. It is to be understood that IGFET 129 may be placed at other points in FIG. 1 to control the magnitude of the incoming signal placed on capacitor 139. For example, the source-drain path of IGFET 129 may replace impedance 145 whereby the magnitude of the incoming signal stored in capacitor 139 can be controlled in accordance with the control signal stored in capacitor 153. Alternatively, the source-drain path of IGFET 129 may be placed between the junction of impedance 147 with the gate of IGFET 131 and the source of IGFET 112 and the same gain control can be obtained.

When there is no signal applied to the line circuit of FIG. 1 from line 101, the degree and the direction of imbalance may be measured by comparing the signal appearing on lead 76 responsive to an incoming signal on lead 74 to the incoming signal. Thus correction of imbalance may be accomplished by comparing the polarity of the incoming signal samples on lead 74 with the polarity of the outgoing signal samples on lead 76 in selected time slots during a predetermined test interval. If the sample comparisons show that the polarity of the incoming signal is the same as the polarity of the resulting outgoing signal, a first polarity control signal is generated which causes the output signals from IGFETs 127 and 131 to increase. When the sample comparisons show that the polarity of the incoming signal is opposite to that of the resulting output signal, a second polarity signal is generated which causes the output signals of IGFETs 127 and 131 to decrease. The result of the correction process is to equalize the signal from amplifier 112 stored in capacitor 137 with the signal from IGFETs 127 and 131 stored in capacitor 139 in FIG. 1. When the balance is correct, the polarity of the outgoing signal is random with respect to the polarity of the incoming signal over the test time interval. Under these conditions, no correction is required and the control signal is zero.

The block diagram of FIG. 2 shows an arrangement for correcting the balance of a line circuit when it is not actively participating in a call connection. FIG. 2 includes line circuits 203-1 through 203-n. Line circuit 203-1, for example, provides an outgoing signal to outgoing time division bus 210 via lead 76-1. In a call connection, all the outgoing signals are applied to outgoing bus 210 and therefrom through amplifiers 214 and 218 to incoming time division bus 212. Line circuit 203-1 receives the incoming signal via lead 74-1. Control 250 is operative to provide signals which allow the participating line circuits to operate in a selected time slot.

The participating line circuits are selected through gates 205-1 through 205-n by control codes transmitted from control 250 via cable 260. With respect to line circuit 203-1, gate 205-1 is opened during the time slot in which line circuit 203-1 has been selected for a call connection being established and the designated time slot is stored in register 102. The balance of line circuit 203-1 may then be tested through the use of a tone signal generated in tone source 220 prior to the establishment of the call connection. This tone source may be any of the tone sources normally used to set up a connection such as dial tone, ringback tone or busy tone or it may be a special tone source dedicated to balance testing.

Before an active call connection is established, there is no signal applied to line circuit 203-1 from its connected line 201-1. The tone signal from time division sampled tone source 220 is applied to lead 74-1 via amplifiers 216, 218 and incoming time division bus 212. During each selected time slot, the signal applied to lead 74-1 is transmitted to the line circuit and an outgoing signal may be obtained from lead 76-1. The outgoing signal from line circuit 203-1 is applied to amplifier 214 via outgoing time division bus 210 and the sign of the outgoing signal is detected in detector 224. The sign of the sampled tone signal from tone source 220 is detected in sign detector 226. The sign comparison is performed in an updown control 228 which may comprise an exclusive-or logic circuit arranged to provide one output if the signs are the same and another output if the signs are different.

When the sign of the outgoing signal on bus 210 is the same as the sign of the tone signal during the selected time slot, updown counter 231 is decremented from its initial state determined by control 250. The initial state of counter 231 is its midcount position. When the signs of the tone signal and the line circuit outgoing signal are opposite during the selected time slot, updown counter 231 is incremented. If the balance of line circuit 203-1 is acceptable, the outputs of control 228 randomly increment and decrement counter 231 so that the count is within the range of the counter.

When the balance is incorrect, for example, the output of control 228 is a succession of decrementing pulses obtained because the signs of the tone signal and the circuit outgoing signal are consistently the same, the range of counter 231 is exceeded and an underflow occurs which underflow causes updown counting type register 233 to decrement by one count. Upon the occurrence of underflow, updown counter 231 is reset to midcount position by reset logic 235. When the output of control 228 is a succession of incrementing pulses obtained because the signs of the tone and outgoing signals are consistently different, the range of counter 231 is exceeded and an overflow occurs which overflow causes updown register 233 to be incremented. The code stored in updown register 233 indicates the degree of imbalance of the line circuit being tested and the output of register 233 is applied to digital-to-analog converter 239 which provides an analog control signal to gain bus 262 through switch 267. Gain bus 262 is connected to all line circuits.

During a designated time slot, the control signal from line 262 is applied to line circuit 203-1 via lead 70-1. The designated time slot is selected by control 250 and a code is transmitted via gate 207-1 and cable 78-1 to IGFET switch 125 in FIG. 1. In the line circuit shown in FIG. 1, switch 125 is closed in the designated time slot so that the control signal is stored in capacitor 153. The stored control signal is applied to the gate of IGFET 129 whereby the gain of the amplifier including IGFETs 127 and 131 is controlled by varying the resistance of the drain-source path of IGFET 129. In this way, the balance of the line circuit 203-1 is corrected.

Where the imbalance is caused by a constant impedance condition on line 201-1, the code established in register 233 is constant and this code may be used in further call connections provided that the line impedance of the circuit being tested does not change. Balance memory 237 is used to store the correction code associated with a line circuit in a predetermined address which address is supplied by control 250 via cable 280. Each line circuit is periodically scanned for supervisory purposes. During the time slot when the tested circuit is scanned, the line circuit balance switch (IGFET 125 in FIG. 1) is closed responsive to the operation of one of gates 207-1 through 207-n. The connection code is retrieved from balance memory 237 and placed in register 233. Responsive to the balance code in register 233, a control signal is generated in converter 239 which is transferred to the line circuit balance capacitor (capacitor 153 in FIG. 1). In this way, the balance signal on capacitor 153 is periodically replenished. If the line circuit under test continues to be unbalanced during the test time interval, regardless of the feedback control signal, the range of register 233 is exceeded and limit alarm 241 is set so that maintenance action may be taken.

Idle and hold memory 264 controls the operation of switch 267. The idle and hold memory stores the supervisory state of the line circuit being tested and is addressed from control 250. In the event that the line circuit is in the idle condition or is in the hold condition during the periodic scan, bus 262 is connected to a negative bias source through switch 267 so that the line circuit receives a large negative signal that is operative to turn off the driving amplifier including IGFETs 127 and 131 shown in FIG. 1.

The block diagram of FIG. 3 shows an arrangement for balancing a hybrid circuit during an active call connection. In FIG. 3, lines 301-1 through 301-n are connected to outgoing bus 310 and incoming bus 312 via line circuits 303-1 through 303-n respectively. Lines 309-1 through 309-n are connected to outgoing bus 311 and incoming bus 313 via line circuits 308-1 through 308-n. Assume for purposes of illustration that line 301-1 and line 309-1 are engaged in a call connection during the one selected time slot. The outgoing signal from line 301-1 is applied to outgoing bus 310 via line circuit 303-1 and lead 76-1a. The outgoing signal from line 309-1 is applied to outgoing bus 311 via line circuit 308-1 and lead 76-1b. The outgoing signals are applied through amplifiers 314 and 316 to the inputs of summing amplifier 318 and the sum of the two outgoing signals are applied to line circuit 303-1 via incoming bus 312 and lead 74-1a. Similarly, the sum of the outgoing signals is applied to line circuit 308-1 via incoming bus 313 and lead 74-1b. Control 350 provides a signal via bus 384 and gate 304-1 to activate line circuit 303-1 through register 102 (FIG. 1) in each selected time slot. Similarly control 350 provides a signal to line circuit 308-1 via bus 384 and gate 306-1 to activate circuit 308-1 in the selected time slot.

In order to balance a line circuit, it is necessary to test the circuit which is connected to the listening party. In this way, the outgoing signal from the listening circuit which results from the sum signal if compared with the sum signal output of amplifier 318 to indicate the degree of balance. In the selected time slot, a signal is applied from control 350 via lead 386 to close switches 371, 373 and 375. The outgoing signal from circuit 301-1 is applied to peak level integrator 354 via outgoing bus 310, amplifier 314 and switch 371. At the same time, the outgoing signal from circuit 308-1 is applied to peak level integrator 352 via outgoing bus 311, amplifier 316 and switch 373. Peak level integrator 352 detects the average peak value of the outgoing signal from circuit 308-1 during the selected time slot and integrator 354 detects the average peak value of the outgoing signal from circuit 303-1 during the selected time slot. The peak levels from integrators 353 and 354 are compared in "less than" detector 356 which provides one type control signal in the event that the signal from circuit 303-1 is smaller than the signal from circuit 308-1 and a different type signal in the event that the signal from circuit 308-1 is less than the signal from circuit 303-1.

Assume that the outgoing signal from circuit 203-1 is less than the outgoing signal from circuit 308-1. Polarity change detector 326 is then conditioned to respond to the polarity of the signal from circuit 303-1 applied via switch 371. This signal is the result from the sum output of amplifier 318 in the previous time slot frame. Store 325 receives the output of amplifier 318 via switch 375 during each frame and provides the sum output of the previous frame to polarity change detector 326 during the selected time slot.

Figure 5:
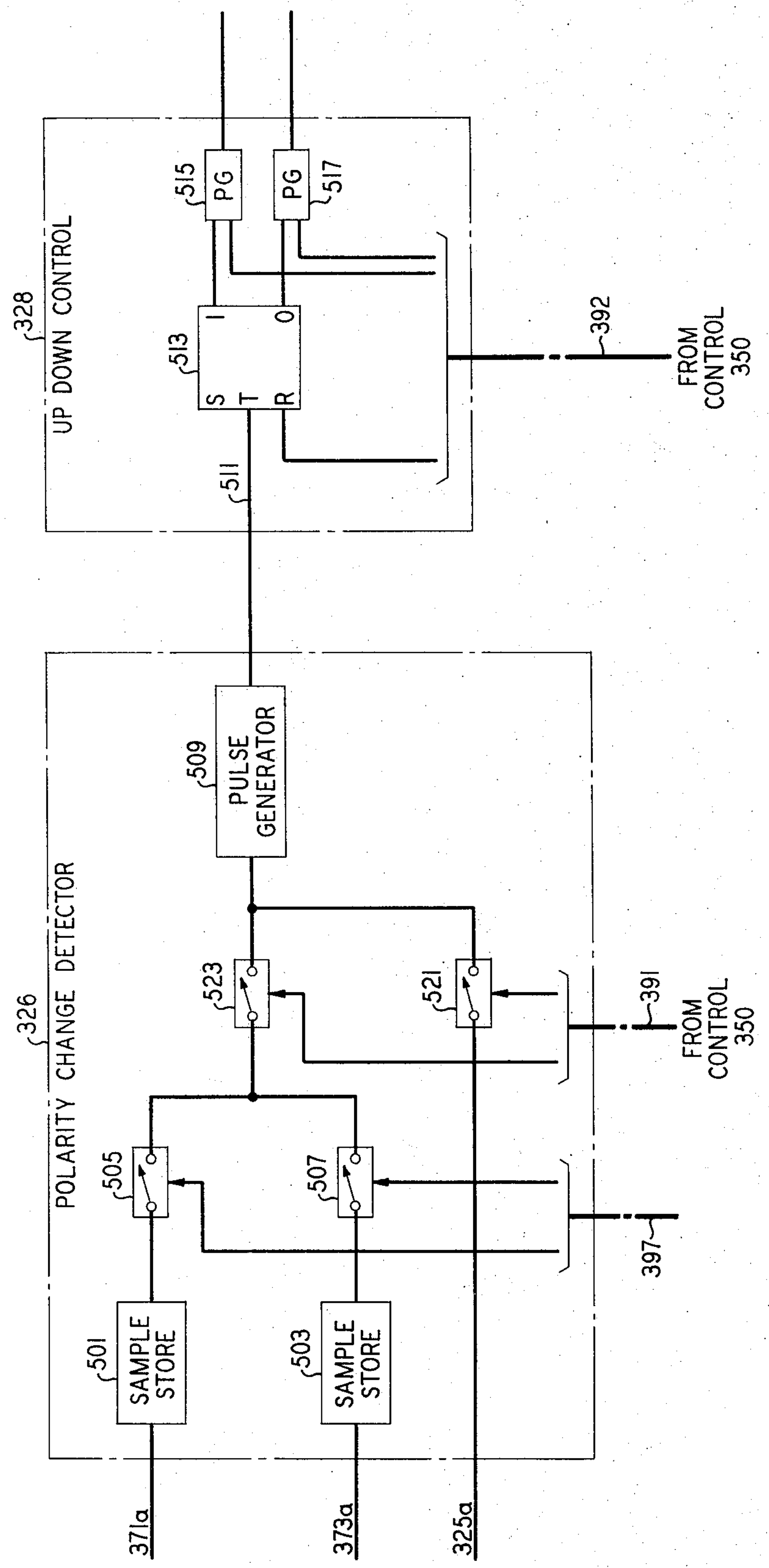
FIG. 5 shows the polarity change detector, and up-down control portions of FIG. 3, in greater detail.

Polarity change detector 326 and updown control 328 are shown in greater detail in FIG. 5. Referring to FIG. 5, polarity change detector 326 comprises sample stores 501 and 503, switches 505, 507, 521 and 523, and pulse generator 509. Updown control 328 comprises toggle flip-flop 513 and pulse generators 515 and 517. Sample store 501 in polarity detector 326 receives the outgoing signal from line circuit 303-1 via switch 371 and lead 37la during the selected time slot. Sample store 503 receives the outgoing signal from circuit 308-1 via switch 373 and lead 373a in the selected time slot. The stored sum signal from the previous frame is applied to switch 521 via lead 325a. A siganl is applied to switch 521 from control 350 via cable 391 in a designated time slot. This signal causes switch 521 to close and the previous frame sum sample is applied to pulse generator 509. Pulse generator 509 produces an output pulse responsive to a signal greater than a predetermined value on its input. This value can be set so that only a positive sample applied to the input of pulse generator 509 produces an output pulse.

Toggle flip-flop 513 as well known in the art operates to change state responsive to each pulse applied to the T input. This flip-flop is reset to its "O" state at the beginning of each test time frame by a signal applied from control 350 via lead 392 to the reset input of flip-flop 513. Responsive to each pulse from generator 509 on lead 511, flip-flop 513 is switched to its opposite state. Thus if the sum sample from the previous frame is positive, the resulting output pulse from generator 509 toggles flip-flop 513 to its "1" state. During a later time slot in each frame, switch 523 is closed so that the outgoing signal from one of sample stores 501 or 503 is closed in response to the output from "less than" detector 356 applied via cable 397 if the outgoing signal from line circuit 303-1 is less than the outgoing signal from line circuit 303-1 is less than the outgoing signal from line 308-1. Alternatively, switch 507 is closed if the outgoing signal from line 308-1 is less than the outgoing signal from line circuit 303-1.

Assume that the outgoing signal from outgoing line circuit 303-1 is less than the outgoing signal from 308-1. In this event, switch 505 is closed and the stored sample from sample store 501 is applied to generator 509 via switches 505 and 523. If the stored sample is positive, pulse generator 509 produces an output pulse which toggles flip-flop 513 to its zero state. Thus, in response to two positive output pulses from generator 509, flip-flop 513 is in its zero state. If both the previous sum sample and the resulting outgoing signal sample are negative, flip-flop 513 is not altered and remains in its zero state. Thus, where the polarity of the previous sum sample and the polarity of the outgoing signal sample are the same, flip-flop 513 is in its zero state responsive to the operation polarity change detector 326. If on the other hand, the polarity of the previous sum sample and the resulting outgoing signal sample are opposite, only one pulse is applied to the toggle input of flip-flop 513 and flip-flop 513 ends up in its one state. At the end of each time slot frame, a signal is applied from control 350 to each of pulse generators 515 and 517 in updown control 328. Where flip-flop 513 is in its zero state, pulse generator 517 produces an output pulse which is applied to updown counter 331 to increment counter 331. Alternatively, if flip-flop 513 is in its one state, an output pulse is obtained from pulse generator 515 which output pulse decrements counter 331.

Counter 331 is initially set to its mid-count position by a signal from control 350 via lead 382. In the event there is a mismatch between the polarity of the previous frame sum signal and the polarity of the outgoing signal from circuit 303-1 detected in detector 326, updown counter 331 is decremented. In the event, the balance of circuit 303-1 is correct, the signals from polarity change detector 326 cause counter 331 to be randomly incremented and decremented and the count stored therein does not exceed the range of counter 331. When the polarity of the sum signal and the polarity of the outgoing signal from circuit 303-1 consistently match during the test time interval, the range of counter 331 is exceeded and an overflow signal is applied to updown register 332. Register 332 stores a code resulting from the overflow and underflow pulses of counter 331. An overflow signal from counter 331 causes the code in register 332 to be incremented by one and an underflow causes the code in register 332 to be decremented by one. The ouput of register 332 is applied to digital-to-analog converter 339 wherein an analog control signal is generated. The analog control signal is applied through switch 367 and cable 362 to the balance apparatus of circuit 303-1 via lead 70-1. The signal for closing switch 125 is provided by control 350 via bus 394, gate 307-1 and cable 78-1. This analog control signal is then used to adjust the gain of the driver amplifier of circuit 303-1 to restore balance as discussed with respect to FIG. 1.

Balance memory 337 is used to store the correction codes formed in register 332 associated with the line circuit being tested. The code for a particular line circuit is stored in a predetermined location of memory 337 which location is addressed by control 350 via cable 380. At the end of each test interval, the code in register 332 is transferred to balance memory 337 in accordance with the address provided by control 350. During the periodic scanning of the tested line circuit, balance memory 337 is addressed and the code related to the line circuit being tested is placed in register 332. A control signal is then applied to the line circuit being scanned via converter 339 so that the balance correction signal is periodically replenished in the line circuit. In this way all line circuits may periodically have their balance correction signals replenished.

Idle and hold memory 364 stores the supervisory state of the line circuit. In the event a line circuit is in the idle or hold states, the line circuit location in memory 364 is addressed by control 350 via lead 395 and a signal corresponding to the supervisory state of the line circuit is applied to switch 367 so that a negative bias signal is supplied to the line circuit under test via cable 362 when the line circuit is idle or on hold. This negative bias signal turns off the driver amplifier of the line circuit under test. When the line circuit is actively engaged in a call connection, the feedack arrangement of FIG. 3 is completed through switch 367 so that the circuit may be balanced.

FIG. 4 shows a block diagram of a line circuit balance arrangement in accordance with the invention wherein an auxiliary time slot is used in addition to the call connection time slot to provide balance correction. In FIG. 4, lines 401-1 through 401-n are connected to incoming bus 410 and outgoing bus 412 via line circuits 403-1 through 403-n. During the time slot assigned to a call connection, for example a call connection between lines 401-1 and 401-n, the outgoing signal from line 401-1 is applied to outgoing bus 410 through line circuit 403-1 and lead 76-1 and the outgoing signal from line 401-n is applied through circuit 403-n and lead 76-n to outgoing bus 410. The outgoing signals are summed in summing amplifier 414 and the sum of the outgoing signals is returned to circuit 403-1 via incoming bus 412 and lead 74-1. The sum of the outgoing signals is also returned to circuit 403-n via incoming bus 412 and lead 74-n.

Prior to the establishment of a call connection, control 450 is used to apply a pulse to circuit 403-1 via gate 405-1 and lead 72-1 in the selected time slot to activate the register of the line circuit (register 102 shown in FIG. 1). Similarly, a pulse is applied to the register in line circuit 403-n in the selected time slot from control 450 via gate 405-n. In this way, a call connection is established during the selected time slot of each frame.

A line circuit is randomly selected for balance in the arrangement of FIG. 4 during a periodic scan. If the line circuit is engaged in an active call connection and there is an idle time slot in each frame during the call connection, control 450 is alerted for line circuit balance. During the selected time slot, the sum of the outgoing signals is supplied to pulse generator 424 via outgoing bus 410, amplifier 414 and switch 416. In the separate idle time slot, the line circuit being tested is addressed from control 450 via one of gates 407-1 through 407-n so that the outgoing signal from the line circuit under test is obtained but no incoming signal is applied to the tested line circuit.

Assume that circuit 403-1 is under test. A sample of the sum signal is obtained in the selected time slot and this sample appears on the output of amplifier 414. Switch 416 is closed in the selected time slot in response to a signal from control 450 applied via lead 490 and the sum signal sample is applied to pulse generator 424. Generator 424 is adapted to provide an output pulse responsive to a positive signal on its input. A sample of the outgoing signal from circuit 403-1 is obtained in the idle auxiliary time slot in response to the signal from control 450 applied to circuit 403-1 via gate 407-1 and lead 78-1. As aforementioned, the signal on lead 78-1 makes control signal A positive going and control signal $\bar{A}$ negative going. Reset control signal A1 remains negative going. The outgoing signal sample is also applied to pulse generator 424 via gate 416. The output of generator 424 is applied to the toggle input of toggle flip-flop 428 which has been reset to its zero state by control 450 at the start of each time frame. Thus, if both the sum sample and the outgoing signal smaple are positive, flip-flop 428 ends up in its zero state. Similarly, if both the sum sample and the outgoing signal sample are negative, flip-flop 428 remains up in its zero state. Alternatively, if only the sum signal sample is positive or if only the negative signal sample is positive, flip-flop 428 ends up in its one state. At the end of the time frame, pulse generator 494 is activated only if flip-flop 428 is in its one state. Pulse generator 496 is activated at that time if flip-flop 428 is in its zero state. In this way, a comparison is made between the polarity of the sum signal and the polarity of the resulting outgoint signal from the line circuit under test.

Where there is a change in polarity between the sum signal and the resulting outgoing signal, pulse generator 494 provides a signal to increment counter 431. If the polarities of the sum signal and the resulting outgoing signal are the same, pulse generator 496 provides a signal to decrement counter 431. Updown counter 431 is initially set to its midcount position by control 450, and is reset to its midcount position upon the occurrence of each overflow or underflow. If the balance of the line circuit 403-1 is correct, the count in counter 431 is randomly incremented and decremented so that the count does not exceed the range of counter 431. Where the imbalance in circuit 403-1 is such that there is a consistent matchin of the polarities of the sum and the resulting outgoing signal, updown counter 431 overflows and resets successively and provides a series of overflow pulses to updown register 433. In the event there are consistent mismatches between the sum signal and the resulting outgoing signal, counter 431 underflows and rests successively and register 433 records a code corresponding to the numbers of underflows by successive count downs. Upon each overflow or underflow, counter 431 is reset to its mid-posiiton via reset logic 435.

The code stored in register 433 is applied to digital-to-analog converter 439 which converts the code to an analog control signal. The analog control signal from converter 439 is applied via line 462 and lead 70-1 to circuit 403-1 and may be stored in capacitor 153 shown in FIG. 1 during the auxiliary time slot. If the imbalance is not corrected by the described feedback arrangement, the capacity of updown register 433 is exceeded and the output therefrom sets limit alarm 441 which indicates that maintenance action is required.

At the end of the test interval, the code in register 433 is transferred to a preassigned location in balance memory 437 as addressed by control 450. This preassigned location is set aside for line circuit 403-1 and the code stored therein is transferred back to register 433 under control of control 450 during periodic scanning of the line circuit to provide a correction code. The correction code is converted into a control signal in converter 439 and the control signal replenishes the stored balance correction signal in the tested line circuit. The code stored in each preassigned location of memory 437 is indicative of the condition of the associated line circuit with respect to circuit gain and line matching. The codes of memory 437 may be periodically inspected in a manner well known in the art to determine whether maintenance of the associated lines is required.

What is claimed is:

1. A time division communication system wherein a plurality of time slots occurs in repetitive frames comprising plurality of lines, an incoming time division bus and an outgoing time division bus, each line having an associated hybrid circuit connected to said line and selectively connectible to said incoming and said outgoing time division buses, and hybrid circuit comprising means for transferring a signal from said incoming bus to said line in a selected time slot, means for transferring an outgoing signal from said line to said outgoing bus in said selected time slot and hybrid balancing means responsive to a control signal for minimizing the portion of the signal on said incoming bus being returned to said outgoing bus in said selected time slot, and means for controlling said balancing means in each hybrid circuit comprising first means for detecting the polarity of the signal on said incoming bus, second means for detecting the polarity of the signal on said outgoing bus, means for producing a first type signal responsive to a match between the polarity of the signal from said first detecting means and the polarity of the signal from said second detecting means and for producing a second type signal responsive to a mismatch between the polarity of the signal from said first detecting means and the polarity of the signal from said second detecting means, means responsive to the sequence of first and second type signals for generating said signal, and means for applying said control signal to the balancing means of said hybrid circuit.

2. A time division communication system wherein a plurality of time slots occurs in repetitive frames according to claim 1 wherein the means for transferring a signal from said incoming bus to said selected time slot comprises amplifying means, and said hybrid balancing means comprises means responsive to said control signal for controlling the gain of said amplifying means.

3. A time division communication system wherein a plurality of time slots occurs in repetitive cycles according to claim 2 wherein said amplifying means comprises variable resistance means, and said means for controlling the gain of said amplifying means comprises, means for receiving said control signal in a distinct time slot, means for storing said received control signal, and means responsive to said stored control signal for modifying the resistance of said variable resistance means.

4. A time division communication system wherein a pluarlity of time slots occurs in repetitive frames comprising a plurality of lines, an incoming time division bus and an outgoing time division bus, each line having an associated hybrid circuit connected to said line and selectively connectible to said incoming and outgoing time division buses, said hybrid circuit comprising means for transferring a signal from said incoming bus to said line in a selected time slot, means for transferring an outgoing signal from said line to said outgoing bus in said selected time slot, and hybrid balancing means responsive to control signal for minimizing the portion of the signal on said incoming bus being returned to said outgoint bus in said selected time slot, and means for controlling the operation of said balancing means in each hybrid circuit comprising means for selecting a hybrid circuit for balancing, apparatus operative in distinct time slots of a predetermined test interval comprising first means for detecting the polarity of the signal appearing on said incoming bus being applied to said selected hybrid circuit, second means for detecting the polarity of the outgoing signal from said selected hybrid circuit responsive to said signal appearing on said incoming bus, means for comparing the polarity of said incoming bus signal from said first detecting means with the polarity of said outgoing signal from said second detecting means, said comparing means being operative to produce a first type signal when said polarities are the same and to produce a second type signal when said polarities are different, means responsive to the sequence of first and second type signals from said comparing means for generating said control signal, and means for applying said control signal to the balancing means of said selected hybrid circuit.

5. A time division communication system wherein a plurality of time slots occurs in repetitive frames according to claim 4 wherein said control signal generating means comprises means responsive to said sequence of first and second type signals for generating a control code, means for registering said control code and means responsive to said registered control code for producing said control signal.

6. A time division communication system wherein a plurality of time slots occurs in repetitive frames according to claim 5 wherein said code generating means comprises updown counting means having a predetermined capacity, means responsive to each first type signal in said sequence of first and second type signals for incrementing said counting means, means responsive to each second type signal in said sequence of said first and second type signals for decrementing said counting means, said registering means comprises a counting type register for recording the number of overflows beyond the capacity of said counting means and the number of underflows beyond the capacity of said counting means, means for resetting said counting means to a midcount position responsive to each of said overflows and underflows, and said control signal producing means comprise means connected to said counting type register for converting the control code from said counting type register to an analog control signal.

7. A time division communication system wherein a plurality of time slots occurs in repetitive frames according to claim 5 further comprising means connected to said code registering for storing said control code, means for periodically scanning said hybrid circuit, means for transferring said control code from said storing means to aid registering means during each scan, means for applying said control code from said registering means to said control signal producing means during each scan, and means for applying said control signal from said producing means to said hybrid circuit balancing means during each scan.

8. A time division communication system wherein a plurality of time slots occurs in repetitive frames according to claim 5 further comprising means for detecting an overflow of the range of said registering means and for detecting an underflow of the range of said registering means, and means responsive to the operation of said registering means overflow and underflow detecting means for producing an alarm signal indicative of the said overflow and underflow condition.

9. A time division communication system wherein a plurality of time slots in repetitive cycles comprising a plurality of lines, an outgoing time division bus, an incoming time division bus, each line having an associated hybrid circuit connected to said line and selectively connectible to said outgoing and incoming time division bus, said hybrid circuit including means for applying a signal on said incoming bus to said line in a selected time slot, means for applying the outgoing signal from said associated line to said outgoing bus in said time slot and balancing means responsive to a control signal for minimizing the portion of the incoming bus signal being returned to said outgoing bus, and means or controlling the operation of said balancing means in each hybrid circuit comprising means operative in a distinct time slot for selecting a hybrid circuit for balance adjustment, means operative in said distinct time slot for applying a test signal to said selected hybrid circuit via said incoming bus, means for detecting the polarity of said test signal in said distinct time slot, means for detecting the polarity of the signal applied to said outgoing bus from said selected hybrid circuit in said distinct time slot, means for comparing the polarity of said test signal to the polarity of the signal applied to said outgoing bus from said selected hybrid circuit in said distinct time slot, and means responsive to the sequence of outputs from said comparing means for generating said control signal, and means for applying said control signal to the balancing means of said selected hybrid circuit.

10. A time division communication system wherein a plurality of time slots occurs in repetitive frames according to claim 9 wherein said control signal generating means comprises means responsive to said sequence of outputs from said comparing means for generating a control code, means for registering said control code and means responsive to said registered control code for producing said control signal.

11. A time division communication system wherein a plurality of time slots occurs in repetitive frames according to claim 10 wherein said comparing means produces a first type signal responsive to said test signal polarity and said outgoing bus signal polarity being the same and produces a second type signal responsive to the test signal polarity and the outgoing bus signal polarity being different, said code generating meams comprises updown counting means having a predetermined capacity, means responsive to each first type signal in said sequence of first and second type signals for incrementing said counting means, means responsive to each second type signal in said sequence of said first and second type signals for decrementing said counting means, said registering means comprising a register for recording the number of overflows beyond the capacity of said counting means and the number of underflows beyond the capcity of said counting means, means for resetting said counting means to a midcount position responsive to each of said overflows and underflows, and said control signal producing means comprise means connected to said register for converting the control code from said register to an analog control signal.

12. A time division communication system wherein a plurality of time slots occurs in repetitive frames according to claim 10 further comprising means connected to said code registering means for storing said control code, means for periodically scanning said hybrid circuit, means for transferring said control codes from said storing means to said registering means during each scan, means for applying said control code from said registering means to said control signal producing means during each scan, and means for applying said control signal from said producing means to said hybrid circuit balancing means during each scan.

13. A time division communication system wherein a plurality of time slots occurs in repetitive frames comprising first and second groups of lines, each group having incoming and outgoing time division buses, each line having an associated hybrid circuit connected to said line and selectively connectible to said group incoming and outgoing buses, said hybrid circuit comprising means for transferring a signal from the associated group incoming bus to said line, means for transferring the outgoing signal from said line to the associated group outgoing bus and hybrid balancing means responsive to a control signal for minimizing the group incoming bus signal being returned to the group outgoing bus, means for exchanging signals between a selected first group line and a selected second group line in a selected time slot comprising means for connecting a first group hybrid circuit and a second group hybrid circuit to said first and second group incoming and outgoing buses respectively in said selected time slot, means for summing the outgoing signals on said first and second group outgoing buses in said selected time slot, and means for applying the sum of said outgoing signals to said first and second group incoming buses in said selected time slot, and means for controlling the balancing means in one of said selected hybrid circuits comprising means for detecting the polarity of the sum of the outgoing sigals in said selected time slot, means for detecting the lesser outgoing signal in the next occurring selected time slot, means for producing a first type signal responsive to the detected polarity of the lesser outgoing signal being the same as the detected polarity of the sum of said outgoing signals and for producing a second type signal responsive to the detected polarity of the lesser outgoing signal being different from the detected polarity of the sum of said outgoing signals, means responsive to the sequence of said produced first and second type signals for generating said control signal, and means for applying said control signal to the balancing means of the selected hybrid circuit having the lesser outgoing signal.

14. A time division communication system wherein a plurality of time slots occurs in repetitive frames according to claim 13 wherein said control signal generating means comprises means responsive to said sequence of first and second type signals for generating a control code, means for registering said control code and means responsive to said registered control code for producing said control signal.

15. A time division communication system wherein a plurality of time slots occurs in repetitive frames according to claim 14 wherein said code generating means comprises updown counting means having a predetermined capacity, means responsive to each first type signal in said sequence of first and second type signals for incrementing said counting means, means responsive to each second type signal in said sequence of said first and second type signals for decrementing said counting means, said registering means comprises a register for recording the number of overflows beyond the capacity of said counting means and the number of underflows beyond the capacity of said counting means, means for resetting said counting means to a midcount position responsive to each of said overflows and underflows, and said control signal producing means comprise means connected to said register for converting the control code from said register to an analog control signal.

16. A time division communication system wherein a pluraltiy of time slots occurs in repetitive frames according to claim 14 further comprising means connected to said code registering means for storing said control code, means for periodically scanning said hybrid circuit, means for transferring said control code from said storing means to said registering means during each scan, means for applying said control code from said registering means to said control signal producing means during each scan, and means for applying said control signal from said producing means to said hybrid circuit balancing means during each scan.

17. A time division communication system wherein a plurality of time slots occurs in repetitive frames comprising a plurality of lines, an incoming bus and an outgoing bus, each line having an associated hybrid circuit connected to said line and selectively connectible to said incoming bus and outgoing bus; said hybrid circuit including means for transferring a signal from said incoming bus to said line, means for transferring the outgoing signal from said line to said outgoing bus, and hybrid balancing means responsive to a control signal for minimizing the incoming bus signal being returned to the outgoing bus; means for exchanging signals among a plurality of selected lines in a distinct time slot of each frame comprising means for connecting each selected line hybrid circuit to said incoming and outgoing bus in said distinct time slot, means for summing the outgoing signals on said outgoing bus in said distinct time slot, and means for applying the sum of said outgoing signals to said incoming bus in said distinct time slot, and means for controlling the balancing means in one of said selected hybrid circuits comprising first means for detecting the polarity of the sum of said selected hybrid circuit outgoing signals in said distinct time slot of selected frames, second means for detecting the polarity of the outgoing signal from said one of said selected hybrid circuits in a later occurring time slot of said selected frame, means for comparing the polarity from said first detecting means with the polarity from said second detecting means, said comparing means being operative to produce a first type signal responsive to the polarities being the same and a second type signal responsive to the polarities being different, means responsive to the sequence of first and second type signals from said comparing means for generating said control signal, and means for applying said control signal to the balancing means of said one of said selected hybrid circuits.

18. A time division communication system wherein a plurality of time slots occurs in repetitive frames according to claim 17 wherein said control signal generating means comprises means responsive to said sequence of first and second type signals for generating a control code, means for registering said control code, and means responsive to said registered control code for producing said control signal.

19. A time division communication system wherein a plurality of time slots occurs in repetitive frames according to claim 18 wherein said code generating means comprises updown counting means having a predetermined capacity, means responsive to each first type signal in said sequence of first and second type signals for incrementing said counting means, means responsive to each second type signal in said sequence of said first and second type signals for decrementing said counting means, said registering means comprises a register for recording the number of overflows beyond the capacity of said counting means and the number of underflows beyond the capacity of said counting means, means for resetting said counting means to a midcount position responsive to each of said overflows and underflows, and said control signal producing means comprise means connected to said register for converting the control code from said shift register to an analog control signal.

20. A time division communication system wherein a plurality of time slots occurs in repetitive frames according to claim 18 further comprising means connected to said code registering means for storing said control code, means for periodically scanning said hybrid circuit, means for transferring said control code from said storing means to said registering means during each scan, means for applying said control code from said registering means to said control signal producing means during each scan, and means for applying said control signal from said producing means to said hybrid circuit balancing means during each scan.

21. A communication system comprising a plurality of lines, a first common bus, a second common bus, each line having an associated hybrid circuit connected to said line and selectively connectible to said first and second common buses, said hybrid circuit comprising means for transferring a signal from said first bus to said line, means for transferring an outgoing signal from said line to said second bus, and hygrid balancing means responsive to a control signal for minimizing the portion of the signal on said first bus being returned to said second bus, and means for controlling said balancing means in said hybrid circuit comprising first means for detecting the polarity of the signal on said first bus, second means for detecting the polarity of the signal on said second bus, means for producing a first type signal responsive to a match between the polarity of the signal on said first detecting means and the polarity of the signal on said second detecting means level and for producing a second type signal responsive of a mismatch between the polarity of the signal from said first detecting means and the polarity of the signal on said second detecting means, means responsive to said first and second type signals for generating said control signal, and means for applying said control signal to the balancing means of said hybrid circuit.

* * * * *